No. 772,209. PATENTED OCT. 11, 1904.
R. S. BRYANT.
WHEEL RIM.
APPLICATION FILED FEB. 23, 1904.
NO MODEL.

WITNESSES:
H. B. Bradshaw
A. L. Phelps

INVENTOR
Richard S. Bryant,
BY
Shepherd & Parker
ATTORNEYS.

No. 772,209. Patented October 11, 1904.

UNITED STATES PATENT OFFICE.

RICHARD S. BRYANT, OF COLUMBUS, OHIO.

WHEEL-RIM.

SPECIFICATION forming part of Letters Patent No. 772,209, dated October 11, 1904.

Application filed February 23, 1904. Serial No. 194,666. (No model.)

*To all whom it may concern:*

Be it known that I, RICHARD S. BRYANT, a citizen of the United States, residing at Columbus, in the county of Franklin and State of Ohio, have invented a certain new and useful Improvement in Wheel-Rims, of which the following is a specification.

My invention relates to the improvement of wheel-rims of that class which are adapted to be used in connection with pneumatic tires; and the objects of my invention are to provide a wheel-rim construction with improved means for fastening or locking the tire in connection with the rim and to so construct and arrange said fastening and tire-retaining parts as to admit of the tire being readily and easily removed from the rim and a new tire substituted therefor; to so construct my improved tire fastening and holding parts as to admit of the same being employed in connection with wheel-rims of different types, and to produce other improvements, the details of construction of which will be more fully pointed out hereinafter. These objects I accomplish in the manner illustrated in the accompanying drawings, in which—

Figure 1:
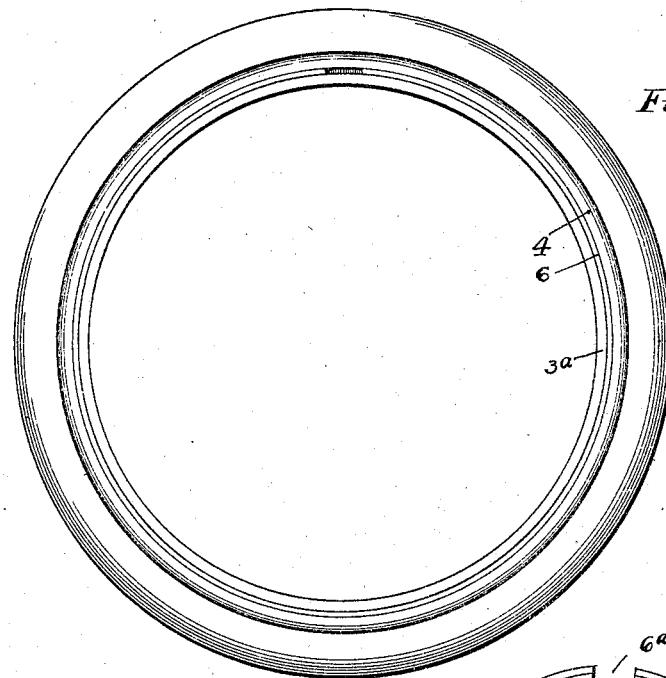
Figure 4:
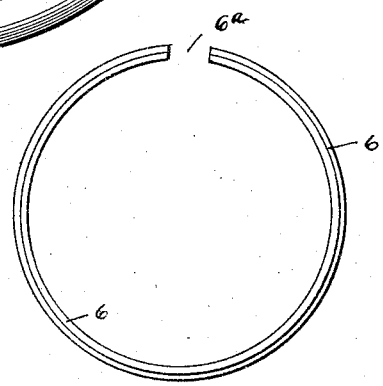
Figure 2:
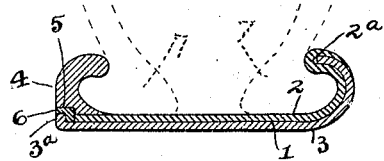
Figure 3:
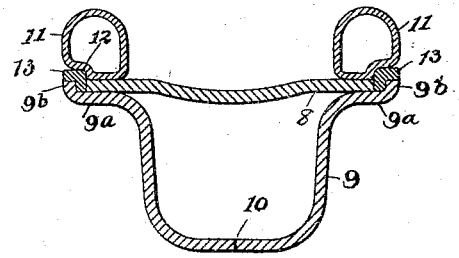

Figure 1 is a view in elevation of a wheel-rim and tire thereon, said rim having my improved construction. Fig. 2 is a transverse section of my improved rim, showing the same constructed for the reception and retention of clencher-tires. Fig. 3 is a transverse section of a modified form or type of rim embodying my improvement, and Fig. 4 is a view in elevation of the locking-rim which I employ in the manner hereinafter described.

Similar numerals refer to similar parts throughout the several views.

1 represents a wheel-rim body, which, as shown in the drawings, consists of upper and lower metallic layers 2 and 3, which are brazed one to the other. These connected layers terminate at one side of the rim in an upward and inwardly turned hook $2^a$, and at the opposite side or edge of the rim the lower member 3 is provided with a short upturned flange or lip $3^a$, the upper member 2 terminating at a short distance from the inner side of this lip.

4 represents a tire-holding ring, which in cross-section is in the form of a hook-shaped body having the general form and character of the hook $2^a$. The flat base of the ring 4 has formed therein at its junction with its outer side an angular recess 5.

6 represents a locking-ring, which is broken at $6^a$, forming a short interspace between the ends, as shown. This ring is angular in cross-section and is adapted to be made to embrace the outturned lip $3^a$ of the rim member 3 in the manner indicated in the drawings. When in this position, it will be observed that one flange or member of the ring 6 extends between the lip 3 and the end of the rim-layer 2, while the other flange of said ring lies on the upper side of the lip $3^a$. When in this position, the ring 6 or that portion of said ring which projects above the surface of the rim-layer 2 engages the recess 5 of the holding-ring 4, thereby locking said ring 4 against slipping off or being moved laterally from the rim. Prior to the placing of the rings 4 and 6 in the positions described, however, the tire, which is shown in dotted lines in Fig. 2 of the drawings, has its inner edge portions, on which are formed the usual clencher-flanges 7, seated in the rim, one of said clencher-flanges being engaged by the hook $2^a$ and the other being adapted to be engaged by the hook-rim 4 when the latter is slipped onto the rim and pressed inward.

The above-described rim construction, as will be readily understood, applies particularly to what are known as "rims employing clencher-tires;" but in Fig. 3 of the drawings I have shown a form of rim to which my improved tire holding and locking device is applied and which is adapted to receive what is known commercially as the "Dunlop tire" and in which the rim-body is in the nature of an all-metal rim of the character adapted for employment in conjunction with the metallic wheel, which is the subject of my former patent, No. 734,254, dated July 21, 1903, for an improvement in wheels. In the construction shown in the said Fig. 3 of the drawings the rim comprises a rim-plate 8, which is depressed centrally to form a seat for the inner tire-tube, said member 8 having brazed to the under side of its outer portions the outturned flanges of a downwardly or inwardly extending hollow rim-body 9, the latter being preferably formed of two equal sections united centrally at the base of the rim-body, as indicated at 10. The outturned flange portions 9ᵃ of this rim extend beyond the lateral edges of the plate 8 and are formed with upturned lips 9ᵇ, corresponding with the upturned lip 3ᵃ of the tire-body 1. In this case the tire-holding rings 11, which are tubular in cross-section, are adapted to be mounted on the upper sides of the outer portions of the plate 8, said tubular rings having formed in their under and outer sides angular recesses 12, which as prescribed for the recess 5 of the rim 1 are intended to be engaged by broken key or locking-rings 13, corresponding in construction with the ring 6 heretofore described.

It will be understood that in the construction shown in Fig. 3 the locking-ring 13 acts to prevent a lateral movement of the retaining-rings 11 in the same manner that the corresponding ring 6 prevents a similar movement of the ring 4.

It will be understood that in removing the tire the air is permitted to escape therefrom, after which the retaining-ring 4 or 11 may be pushed inward and the locking-ring 6 sprung out of engagement with the channel of the rim, and that in placing the tire on the rim the ring 4 or 11 is pressed inward on the tire-body until the locking-ring is sprung into place, after which the retaining-ring may be moved outward to the position shown in the drawings and the tire inflated in the usual manner.

From the construction shown and described it will be seen that improved means are provided not only for retaining the tire in its proper position in the rim, but for the removal or replacement of a tire in a rapid and convenient manner.

Having now fully described my invention, what I claim, and desire to secure by Letters Patent, is—

In a wheel-rim, the combination with the rim-body having a key-channel in its outer face adjacent to its edge, of a detachable tire-retaining ring adapted to be mounted on said rim above said channel, said retaining-ring having an angular recess in its base as described and a broken locking-ring adapted to engage as described said tire-channel and said retaining-ring recess.

RICHARD S. BRYANT.

In presence of—
A. L. PHELPS,
W. L. MORROW.